United States Patent [19]

Chiang

[11] Patent Number: 5,435,986
[45] Date of Patent: Jul. 25, 1995

[54] METHOD FOR PREPARING HIGH PURITY ALUMINUM HYDROXIDE

[75] Inventor: Cyril C. K. Chiang, Taipei, Taiwan

[73] Assignee: Industrial Technology Research Institute, Hsinchu, Taiwan

[21] Appl. No.: 298,520

[22] Filed: Aug. 30, 1994

[51] Int. Cl.$^6$ .............................................. C01F 7/02
[52] U.S. Cl. .................................. 423/627; 423/629; 423/127
[58] Field of Search ........................ 423/629, 627, 127

[56] References Cited

U.S. PATENT DOCUMENTS

| | | | |
|---|---|---|---|
| 2,733,219 | 1/1956 | Bloch | 423/627 |
| 2,958,582 | 11/1960 | Hervert et al. | 423/627 |
| 2,989,372 | 6/1961 | Gilbert | 423/627 |
| 3,071,436 | 1/1963 | Hervert et al. | 423/627 |
| 3,488,147 | 1/1970 | Keith et al. | 423/627 |
| 3,494,733 | 2/1970 | Keith et al. | 423/627 |
| 4,612,184 | 9/1986 | Seigneurin | 423/626 |
| 4,755,374 | 7/1988 | Martin et al. | 423/627 |
| 5,100,641 | 3/1992 | Schmidt et al. | 423/624 |
| 5,225,229 | 7/1993 | Martin et al. | 423/629 |

FOREIGN PATENT DOCUMENTS

| | | | |
|---|---|---|---|
| 49-23198 | 3/1974 | Japan. | |
| 5-13891 | 2/1993 | Japan. | |
| 1255573 | 9/1986 | U.S.S.R. | 423/629 |

Primary Examiner—Steven Bos
Attorney, Agent, or Firm—W. Wayne Liauh

[57] ABSTRACT

An improved process for making high purity aluminum hydroxide [Al(OH)$_3$.3H$_2$O] of the hydrargillite form containing the steps of: (a) adding a non-powdered aluminum solid, preferably aluminum ingots, into a hot water bath at about 70° C. to form a reaction mixture; (b) stirring the reaction mixture for about 20 minutes: (c) adding an alkaline-generating solid, preferably sodium hydroxide solids, into the reaction mixture and heating the reaction mixture to reach boiling point temperature; (d) lowering the temperature of the reaction mixture to 75°~80° C. and stirring the reaction mixture for about 60 minutes; (e) lowering the temperature of the reaction mixture to room temperature; and (f) filtering the reaction mixture to obtain the high purity aluminum hydroxide form. The high purity of the final product was confirmed by data from X-ray diffraction and thermogravimetric analysis. Compared to the prior art processes this process has the advantages that: (1) it does not require a crystallization seed nor a gaseous reactant, thus greatly simplifying the production procedure; and (2) it does not involve a hydrofluoric acid, thus greatly improving logistics and the safe handling of the production operation.

11 Claims, 3 Drawing Sheets

Bayerite

Gibbsite

Nordstrandite

METHOD FOR PREPARING HIGH PURITY ALUMINUM HYDROXIDE

FIELD OF THE INVENTION

This invention relates to a method for the preparation of high purity aluminum hydroxide. More particularly, this invention relates to an efficient and cost-effective process for the preparation of aluminum hydroxide [$Al(OH)_3 \cdot 3H_2O$] in the form of hydrargillite, which can then be used for the production of high-purity aluminum oxide ($Al_2O_3$) for use in high-tech industries, such as electronic and optics industries.

BACKGROUND OF THE INVENTION

Aluminum oxide ($Al_2O_3$) is one of the most important raw materials in modern day industries. High purity aluminum oxide finds many important applications in the production of metallic aluminum, or for use as a substrate or insulation material in the electronic and optics industries. Conventionally, aluminum oxide can be obtained from mining bauxites. However, naturally occurring bauxites do not satisfy the quality requirement in many applications, and high grade aluminum oxide must be obtained from chemical synthesis. One of the most commonly employed techniques in making high purity aluminum oxide involves de-hydration of aluminum hydroxide [i.e., $Al(OH)_3 \cdot 3H_2O$], in a process that has been well-known as the Bayer process:

$$2\ Al(OH)_3 \rightarrow Al_2O_3 + 3\ H_2O$$

Aluminum hydroxide exists in various crystalline forms, or phases, including the three main phases of hydrargillite (or gibbsite), bayerite and nordstrandite. The main difference among these different phases is the arrangement of the hydroxide group ($OH^-$) around the aluminum atom. Among the various phases of aluminum hydroxide, only the $\alpha$-phase (i.e., the hydrargillite or gibbsite phase) exists naturally in large quantities. Aluminum hydroxide of the hydrargillite (or gibbsite) form is also the most stable; it constitutes the main composition of bauxite mines in the American continent. As described above, bauxite has been used traditionally in making aluminum oxide using the Bayer process. However, because of the impurities that exist in the naturally occurring bauxite, the quality of the aluminum oxide so obtained has been largely considered inadequate for high-tech use. This is true even with the naturally occurring aluminum hydroxide of the hydrargillite phase. In addition to the problem of inadequate purity, conventional processes also suffer the shortcomings of inefficient production procedure and relatively high production cost.

Aluminum hydroxide of the hydrargillite phase can also be produced synthetically. Part of the Bayer process also teaches the production of aluminum hydroxide from (1) reaction between carbon dioxide and sodium aluminate ($NaAlO_2$) or (2) reacting sodium aluminate with water, then, in the presence of aluminum hydroxide nucleation seeds, precipitating the reaction products through nucleation and crystallization. The reaction to form aluminum hydroxide according to the Bayer process can be summarized as follows:

$$2\ NaAlO_2 + CO_2 + 3\ H_2O \rightarrow 2\ Al(OH)_3 + Na_2CO_3 \quad (1)$$

$$NaAlO_2 + 2\ H_2O \rightarrow Al(OH)_3 + NaOH \quad (2)$$

As described, the Bayer process uses sodium aluminate ($NaAlO_2$) as a reactant to produce sodium hydroxide. The product obtained from the above process generally meets the purity standard required by the industry. However, the first process, which utilizes carbon dioxide, involves a relatively cumbersome procedure, such as preventing leaks, that is typically associated with the handling of a gaseous reactant. On the other hand, the second process requires the use of high purity aluminum hydroxide as nucleation seeds: this severely encumbers the overall efficiency of the manufacturing process.

Hydrothermal synthesis was considered the first alternative that has been proposed to prepare high purity aluminum trihydroxide. Misra and his co-workers published an article in "Journal of Crystal Growth," Vol. 8, p. 172 (1971). In that article, hydrothermal technique was employed under high temperature and high pressure conditions in an attempt to crystallize aluminum trihydroxide in gibbsite form. However, hydrothermal synthesis for years has not been seriously considered as a practical process for the mass production of any raw material, because the reaction can easily become out of control when the system pressure exceeds several hundred atmospheres.

Other processes are also disclosed in the art for the production of aluminum hydroxide. U.S. Pat. No. 4,612,184 discloses a process for the preparation of high specific surface hydrargillite by first reacting an alkali metal aluminate with hydrofluoric acid, then filtering and washing the resultant aluminum hydroxide precipitates. U.S. Pat. No. 5,225,229 discloses a method for the production of aluminum hydroxide by reacting water in the liquid phase with aluminum powder at a pH above about 12.4, in the presence of chlorine. An alpha alumina promotor is added to the reaction mixture as the aluminum hydroxide is precipitating. These processes provided some improvements over the classical Bayer process, but they also introduced other drawbacks. Most notably, hydrofluoric acid is well-know to be very corrosive against glass containers, and its transportation, especially on a large scale and having to cross interstate lines, can create significant logistic nightmares. Therefore, although the use of hydrofluoric acid in the place of carbonic acid eliminates the need of using aluminum hydroxide nucleation seeds, it is not a practical substitute, as far as industrial scale production of aluminum hydroxide is concerned.

SUMMARY OF THE INVENTION

The primary object of the present invention is to develop a process for the production of industrial grade high purity aluminum hydroxide [$Al(OH)_3 \cdot 3H_2O$]. More particularly, the primary object of the present invention is to develop a cost-effective and much simplified process for the production of high purity aluminum hydroxide of the hydrargillite (or gibbsite) form with uniform particle diameter without the need for nucleation seeds or the use of a gaseous reactant. The aluminum hydroxide produced from the process disclosed in the present invention can be readily used for the production of high-purity aluminum oxide ($Al_2O_3$) for use in high-tech industries, such as electronic and optics industries.

In the process disclosed in the present invention, aluminum ingots are first introduced into a hot water bath. An appropriate amount of sodium hydroxide solids are then introduced in the water bath. The mixture is boiled to facilitate a reaction therebetween, then cooled down to room temperature. The precipitates are allowed to settle and collected, and then rinsed with water before drying. The final products, which are very uniform in size, are very high purity aluminum hydroxide of the hydrargillite form. One of the main advantages of the process disclosed in the present invention is that it involves a much simplified procedure, relative to the prior art processes, and can be easily implemented in large production scales. Compared to the prior art processes for the production of aluminum hydroxide, the present invention offers the distinct advantage of not requiring a crystallization seed. Furthermore, since the process disclosed in the present invention does not require gaseous reactants, it eliminates many of the aggravations that are often encountered in the prior art processes.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
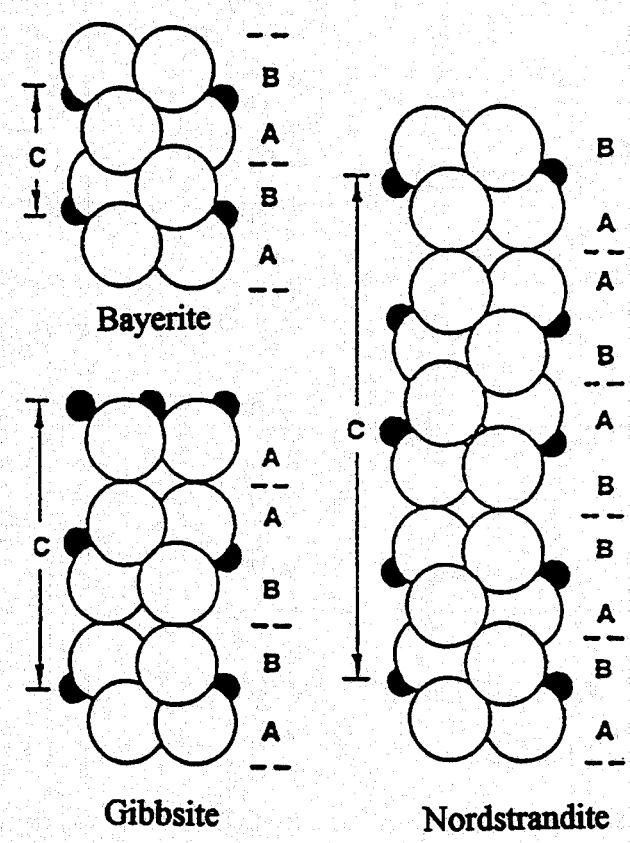
FIG. 1 shows the schematic illustrations of the atomic arrangements of the three most commonly encountered crystalline phases of aluminum hydroxide: hydrargillite (or gibbsite) phase, bayerite phase, and nordstrandite phase.

As discussed above, aluminum hydroxide crystals exist in three major crystalline phases: hydrargillite (or gibbsite) phase, bayerite phase and nordstrandite phase. The main difference among these different phases is the arrangement of the hydroxide group ($OH^-$) around the aluminum atom. FIG. 1 shows the atomic arrangements of these crystalline phases of aluminum hydroxide. The present invention discloses a novel process for the production of aluminum hydroxide of the hydrargillite form.

One of the main advantages of the process disclosed in the present invention is the distinct simplicity of the procedures involved for the production of industrial grade high purity aluminum hydroxide of the hydrargillite form. In the process disclosed in the present invention, aluminum ingots are first introduced into a hot water bath. An appropriate amount of sodium hydroxide particles are then added to the water bath. The mixture is boiled to facilitate the reaction, then cooled down to room temperature. The precipitates are collected and rinsed with water before drying in an oven. The final products are very uniform-sized high-purity aluminum hydroxide particles of the hydrargillite form. The process disclosed in the present invention can be easily implemented in large-scale production, and, compared to the prior art processes, it does not require a crystallization seed nor does it not involves a gaseous reactant. Therefore, it eliminates many of the problems that often encountered in the prior art processes, and can be easily implemented in large-scale production operations of industrial grade aluminum hydroxide of the hydrargillite form.

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

EXAMPLE 1

Into a 70° C. hot water bath, an appropriate amount of aluminum ingots at 8–20 mesh (obtained from J. T. Baker) were added. The solution was stirred and maintained at 70° C. for 20 minutes. Sodium hydroxide particles were added to the solution, in the amount of aluminum ingots sodium hydroxide by weight equal to 4:1. The solution was heated so that its temperature was raised to boiling temperature, and stayed at boiling point temperature for 30 minutes. The temperature of the solution was then lowered to 75°~80° C., and continued stirring for 60 minutes. White precipitates began to be observed suspending in solution. The solution was cooled down to room temperature and stirring was stopped. The suspending particles were allowed to settle to the bottom of the water bath, and were collected via a conventional filtration procedure. The unreacted aluminum ingots were removed. The white precipitates were rinsed with water, and then placed in an 100° C. oven for drying.

Figure 2:
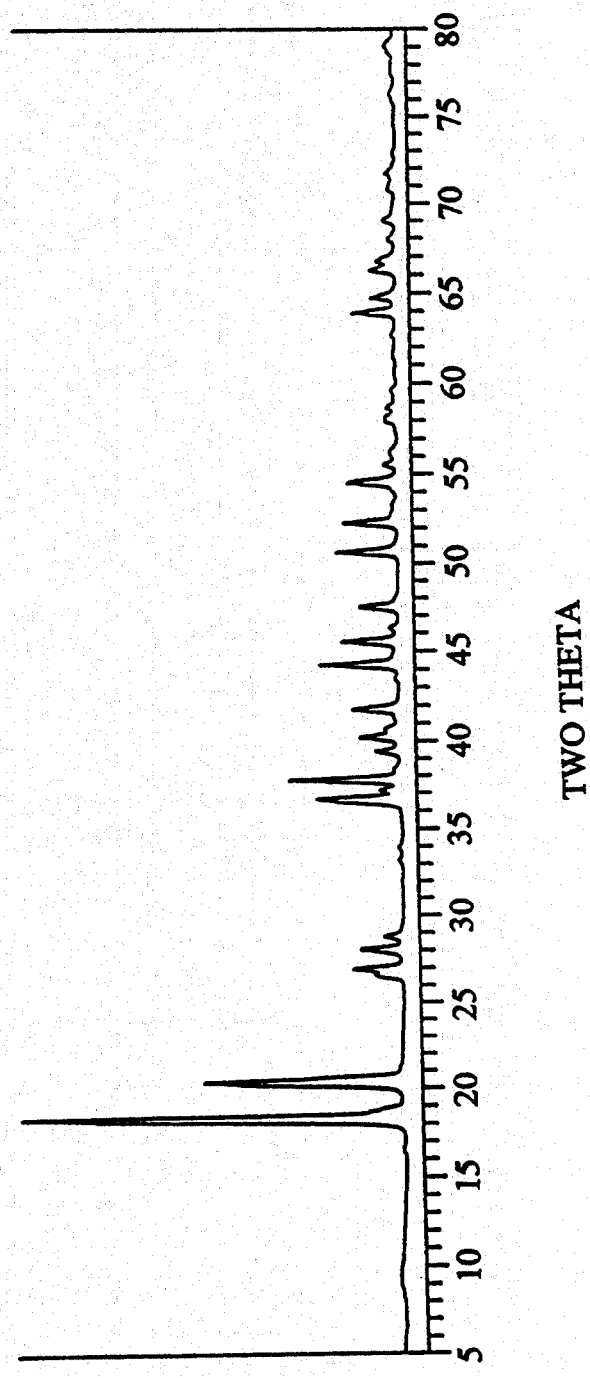
FIG. 2 is a plot showing the result of an X-ray diffraction analysis for the aluminum hydroxide of the hydrargillite (gibbsite) form prepared in the present invention.
Figure 3:
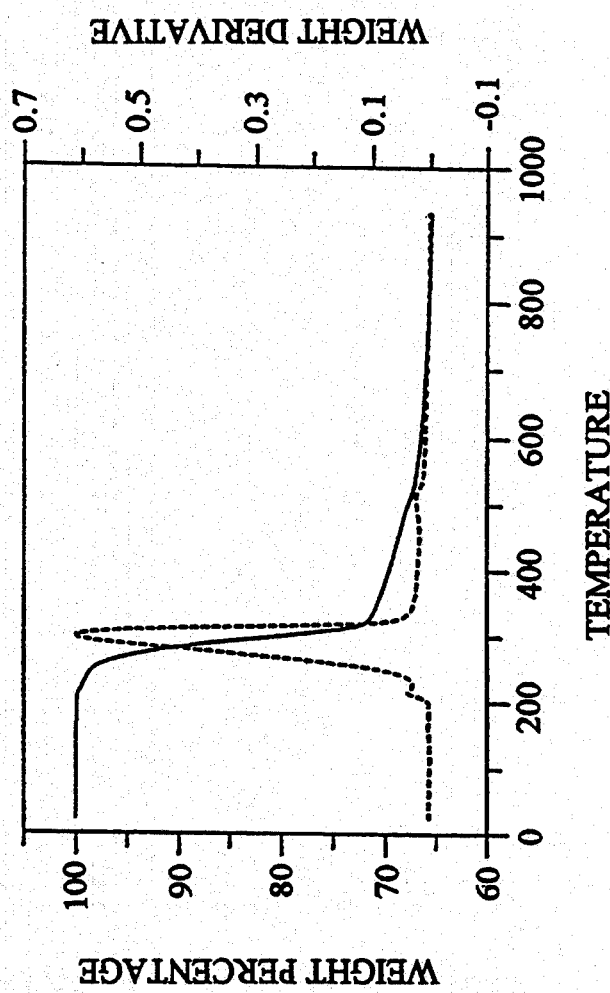
FIG. 3 is a plot showing the result of a thermogravimetric analysis for the aluminum hydroxide of the hydrargillite (gibbsite) form prepared in the present invention.

The dried product was tested with X-ray diffraction and thermogravimetric analysis. FIG. 2 is a plot showing the result of an X-ray diffraction analysis for the aluminum hydroxide of the hydrargillite (gibbsite) form prepared in the present invention. The X-ray diffraction analysis indicated that the product contained very high purity aluminum hydroxide of the hydrargillite phase, and that no impurity was observed. FIG. 3 is a plot showing the result of a thermogravimetric analysis for the aluminum hydroxide of the hydrargillite (gibbsite) form prepared in the present invention. The measured change in weight was 34.52%; this match well with the calculated theoretical value of 34.61%. It should be noted that the hydrargillite form aluminum hydroxide prepared from the drying process does not contain the three crystalline water molecules, as indicated by the thermogravimetric analysis result. After the dry particles are placed in air, water molecules will be absorbed on their surface to form the tri-hydrate crystalline structure. This will not affect their chemical structure.

The foregoing description of the preferred embodiments of this invention has been presented for purposes of illustration and description. Obvious modifications or variations are possible in light of the above teaching. For the aluminum ingots can be replaced with other metallic aluminum materials, and sodium hydroxide can be replaced with other alkaline materials, such as sodium carbonate ($Na_2CO_3$), etc. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for making high purity hydrargillite aluminum hydroxide comprising the steps of:
   (a) adding a non-powdered aluminum solid into a hot water bath of about 70° C. to form a reaction mixture;
   (b) stirring said reaction mixture;
   (c) adding an effective amount of an alkaline-generating solid selected from the group consisting of sodium hydroxide and sodium carbonate into said reaction mixture to form said hydrargillite and heating said reaction mixture to its boiling point temperature;
   (d) lowering the temperature of said reaction mixture to 75°~80° C. while stirring is continued;
   (e) lowering the temperature of said reaction mixture to room temperature; and recovering high purity hydrargillite aluminum hydroxide from the reaction mixture.

2. The process for making high purity hydrargillite aluminum hydroxide according to claim 1 wherein said non-powdered aluminum solid comprises aluminum ingots.

3. The process for making high purity hydrargillite aluminum hydroxide according to claim 2 wherein said aluminum ingots are about 8-20 mesh in size.

4. The process for making high purity hydrargillite aluminum hydroxide according to claim 1 wherein said reaction mixture is stirred for about 20 minutes at about 70° C. during step (b).

5. The process for making high purity hydrargillite aluminum hydroxide according to claim 1 wherein said alkaline-generating solid is sodium hydroxide.

6. The process for making high purity hydrargillite aluminum hydroxide according to claim 5 wherein said sodium hydroxide is added in a ratio of 1:4 by weight relative to said non-powdered aluminum solid.

7. The process for making high purity hydrargillite aluminum hydroxide according to claim 1 wherein said alkaline-generating solid is sodium carbonate.

8. The process for making high purity hydrargillite aluminum hydroxide according to claim 1 wherein said reaction mixture is maintained at boiling point temperature for about 20 minutes at step (c).

9. The process for making high purity hydrargillite aluminum hydroxide according to claim 1 wherein, during step (d), said reaction mixture is stirred at 75°~80° C. for about 60 minutes.

10. The process for making high purity hydrargillite aluminum hydroxide according to claim 1 which further comprises the step of filtering said reaction mixture from step (e) to obtain high purity hydrargillite aluminum hydroxide.

11. The process for making high purity hydrargillite aluminum hydroxide according to claim 10 wherein said high purity aluminum hydroxide obtained after filtering is placed in a 100° C. oven to obtain dry solids.

* * * * *